Patented July 15, 1947

2,423,981

UNITED STATES PATENT OFFICE 2,423,981

POLYVINYL ACETAL RESIN COMPOSITION

David S. Kaltreider, Springfield, Mass., assignor to Monsanto Chemical Company, St. Louis, Mo., a corporation of Delaware No Drawing. Application June 14, 1943,
Serial No. 490,773

8 Claims. (Cl. 260—36)

This invention relates to polyvinyl acetal resin compositions and more particularly to plasticized polyvinyl acetal resin compositions.

One object of this invention is to provide improved polyvinyl acetal resin compositions.

Another object is to provide improved plasticized polyvinyl acetal resin compositions.

More particularly, an object of this invention is to provide improved plasticized polyvinyl acetal resin compositions substantially free from tack at elevated temperatures.

A further object of this invention is to provide articles of manufacture made from plasticized polyvinyl acetal resins which are non-tacky at elevated temperatures and from which there is no exudation or bloom at elevated temperatures or on long continued storage.

One of the major drawbacks to certain uses for poylvinyl acetal resins, particularly plasticized polyvinyl acetal resin compositions has been the high degree of cohesion between superimposed sheets or other articles made therefrom or coated therewith, the degree of cohesion being so high that it is frequently impossible to separate such sheets or articles without injury thereto. This difficulty is particularly troublesome at elevated temperatures such as prevail in summer especially in warm climates or which are employed in certain manufacturing processes.

According to the present invention improved compositions are obtained by incorporating in a polyvinyl acetal resin an amide of the formula R—CO—NHR$_1$, wherein R is an alkyl group having not more than 5 carbon atoms and R$_1$ is an alkyl group having from 14 to 18 carbon atoms. More particularly plasticized polyvinyl acetal resin compositions normally tacky at ordinary temperatures are rendered non-tacky even at elevated temperatures by incorporating therewith relatively small amounts of amides of the above formula which have a melting point above about 125° C.

Examples of the amides, which may be used in preparing the compositions of this invention are tetradecyl acetamide, hexadecyl acetamide, octadecyl acetamide, hexadecyl propionamide, hexadecyl butyramide, octadecyl propionamide, hexadecyl formamide, and the like, or mixtures of any of these amides.

The polyvinyl acetal resins employed according to this invention may be made by reacting an aldehyde with a partially or completely hydrolyzed polyvinyl ester. U. S. patent to Morrison et al., Reissue 20,430, dated June 29, 1937, illustrates suitable methods for preparing such resins. Polyvinyl acetal resins prepared in this manner may have a certain number of ester groups, originally present in the polyvinyl ester, which have not been removed, as well as a certain number of hydroxyl groups (which have replaced ester groups) and have not been replaced with acetal groups.

Polyvinyl acetal resins may be made from various aldehydes or mixtures thereof or even from ketones containing an active carbonyl group or from mixtures of aldehydes and ketones. Thus, formaldehyde, acetaldehyde, propionaldehyde, butyraldehyde, valeraldehyde, hexaldehyde, benzaldehyde, crotonaldehyde, cyclohexanone and the like and mixtures thereof may be employed. In general, polyvinyl acetal resins made from saturated lower aliphatic aldehydes are preferred. In particular, polyvinyl acetal resins made with saturated aliphatic aldehydes containing less than 6 carbon atoms and especially those made with formaldehyde, acetaldehyde and butyraldehyde and mixtures thereof are preferred.

According to one embodiment of the present invention, the polyvinyl acetal resins employed may be considered to be made up on a weight basis of 5–25% hydroxyl groups, calculated as polyvinyl alcohol, 0–40% acetate groups calculated as polyvinyl acetate and the balance substantially acetal.

When the acetal is butyraldehyde acetal, according to one embodiment of this invention, the polyvinyl acetal resin contains, on a weight basis, 16–20% hydroxyl groups calculated as polyvinyl alcohol and 0–30% acetate groups calculated as poylvinyl acetate and the balance substantially butyraldehyde acetal.

When the acetal is formaldehyde acetal, according to one embodiment of this invention, the polyvinyl acetal resin may contain 5–8% hydroxyl groups calculated as polyvinyl alcohol, 10–16% acetate groups calculated as polyvinyl acetate and the balance substantially formaldehyde acetal.

An example of a polyvinyl acetaldehyde acetal resin is one containing 7% hydroxyl groups calculated as polyvinyl alcohol, 17% acetate groups calculated as polyvinyl acetate and the balance substantially acetaldehyde acetal.

An example of a mixed acetal resin is one which contains 13% hydroxyl groups calculated as polyvinyl alcohol, 2–6% acetate groups calculated as polyvinyl acetate and the balance acetaldehyde and butyraldehyde acetal groups, in a molar ratio of 65–50% acetaldehyde and 35–50% butyraldehyde acetal groups. The "stickpoint" given in the examples below is defined as the temperature at which two or more layers of the resin composition will cohere under slight pressure so tightly that they cannot be separated without tearing the individual layers. One method of determining the "stick point" is to superimpose a strip 4 inches long, two inches wide and 0.015 inch thick of the composition under examination on a second strip of the same size and composition and then insert the superimposed strips between glass plates. A one-pound weight is then placed on the composite thus produced and finally the entire assembly is heated for ½ hour periods at progressively higher temperatures. The composite is cooled after each heat treatment and the resin strips are then pulled apart. The temperature at which cohesion between the two strips becomes so strong that they cannot be separated without injury thereto after cooling is defined as the "stickpoint."

The following are specific examples of the compositions comprising my invention. Parts are parts by weight.

The polyvinyl acetal resin employed in the following examples was prepared from a polyvinyl acetate having a degree of polymerization such that a one-molar benzene solution possessed a viscosity of 60 centipoises at 20° C. The aldehyde employed in preparing the polyvinyl acetal resin was butyraldehyde and the polyvinyl acetal resin contains, on a weight basis, 16-20% hydroxyl groups, calculated as polyvinyl alcohol, less than 3% acetate groups calculated as polyvinyl acetate and the balance substantially butyraldehyde acetal.

Example 1

| | Parts |
|---|---|
| Polyvinyl butyraldehyde acetal resin | 100 |
| Hexadecyl acetamide | 5 |
| Dibutyl sebacate | 25 |

The foregoing ingredients were mixed in a suitable manner, for example, in a Banbury mixer. The resulting composition was homogeneous and suitable for forming into sheets, for example, by extrusion, or for coating on a suitable base material, such as cloth or other textile material. Sheets made from the foregoing composition were found to have a "stickpoint" above 80° C. No exudation or bloom developed on the surface of sheets or other articles formed or coated with the foregoing composition even after long standing.

In contrast to the above composition, one prepared in the same manner except that paraffin wax was substituted for hexadecyl acetamide, had a "stickpoint" of 60° C. and the surface of a sheet thereof "bloomed" after a relatively short period indicating exudation of the paraffin.

Example 2

| | Parts |
|---|---|
| Polyvinyl butyraldehyde acetal resin | 100 |
| Dibutyl sebacate | 25 |
| Hexadecyl acetamide | 1 |

Example 3

| | Parts |
|---|---|
| Polyvinyl butyraldehyde acetal resin | 100 |
| Dibutyl sebacate | 20 |
| Diphenyl phthalate | 20 |
| Hexadecyl acetamide | 5 |

Example 4

| | Parts |
|---|---|
| Polyvinyl butyraldehyde acetal resin | 100 |
| Triethyleneglycol ester of adipic acid | 15 |
| Butyl ricinoleate | 50 |
| Hexadecyl acetamide | 3 |

Homogeneous compositions were prepared from the ingredients in the above examples in the same manner as in Example 1. The "stickpoint" of these compositions were all above 80° C. and there was no exudation or blooming of the hexadecyl acetamide upon long standing.

In contrast to the products described in Examples 1-4 inclusive compositions made from the components set forth in Example 5 below have a "stickpoint" of 60° C. and tend to stick to each other at temperatures as low as 40° C.

Example 5

| | Parts |
|---|---|
| Polyvinyl butyraldehyde acetal resin | 100 |
| Dibutyl sebacate | 25 |

The amount of hexadecyl acetamide employed in Examples 1-4 may be substantially increased when advantageous, for example, to 10-15 parts. When desired, suitable fillers, pigments or other coloring matter may be incorporated to modify the properties of the compositions of this invention.

The compositions set forth in Examples 1-4 may be used to coat or coat and impregnate cloth or other textile materials. They may be applied to the fabrics by coating from a solution, or from a hot melt or by calendering. Such coated materials possess the advantageous properties characteristic of the present invention and are admirably suited for the preparation of raincoats, pontoon coverings, tent material and the like. Such products may be stored with surfaces thereof in contact and thereafter separated without injury thereto. Furthermore, such products are free from unsightly and disadvantageous exudation on the surface characteristic of similar products made using such material as paraffin wax in the resin composition.

The polyvinyl acetal resin compositions may be applied to the cloth base in any suitable manner, for example, by applying the resin composition from solution in a volatile solvent and then evaporating the solvent or by pressing the composition softened by heat onto the cloth. In place of cloth or other textile base material, the polyvinyl acetal resin compositions may be applied to wood, metal, plaster, or other base materials.

What is claimed is:

1. A composition comprising a polyvinyl acetal resin, a plasticizer therefor, and from 1 to 15 parts of an organic amide per 100 parts of resin, said amide having the formula R—CO—NHR′ wherein R is an alkyl group having less than 4 carbon atoms and R′ is an alkyl group having more than 13 carbon atoms, but less than 19 carbon atoms.

2. A composition as defined in claim 1 wherein the polyvinyl acetal resin is a polyvinyl butyraldehyde acetal resin.

3. A composition as defined in claim 1 wherein the polyvinyl acetal resin is a polyvinyl formaldehyde acetal resin.

4. A composition as defined in claim 1 wherein the polyvinyl acetal resin is a polyvinyl acetaldehyde acetal resin.

5. A composition comprising a polyvinyl acetal resin, a plasticizer therefor, and from 1 to 15 parts of hexadecylacetamide per 100 parts of polyvinyl acetal resin.

6. A composition as defined in claim 5 wherein the polyvinyl acetal resin is a polyvinyl butyraldehyde acetal resin.

7. A composition as defined in claim 5 wherein the polyvinyl acetal resin is a polyvinyl acetaldehyde acetal resin.

8. A composition as defined in claim 5 wherein the polyvinyl acetal resin is a polyvinyl formaldehyde acetal resin.

DAVID S. KALTREIDER.

REFERENCES CITED

The following references are of record in the file of this patent:

UNITED STATES PATENTS

| Number | Name | Date |
|---|---|---|
| 2,098,538 | Charch | Nov. 9, 1937 |
| Re. 20,430 | Morrison | June 29, 1937 |
| 1,986,854 | Reid | Jan. 8, 1935 |
| 2,202,160 | Marks | May 28, 1940 |
| 2,268,121 | Kingsley | Dec. 30, 1941 |

OTHER REFERENCES

Chemicals Glyco, Feb. 1942, page 58.